Nov. 23, 1926.  1,607,694
M. SCHLATTER ET AL
AUTOMOBILE ACCELERATOR PEDAL
Filed March 5, 1924
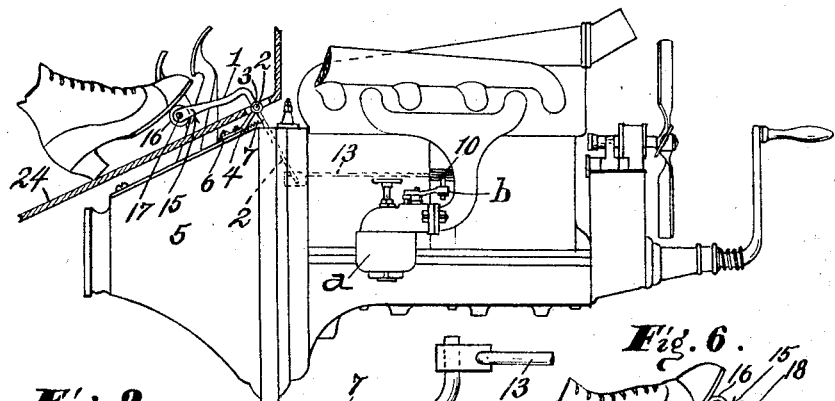
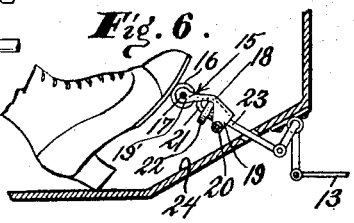
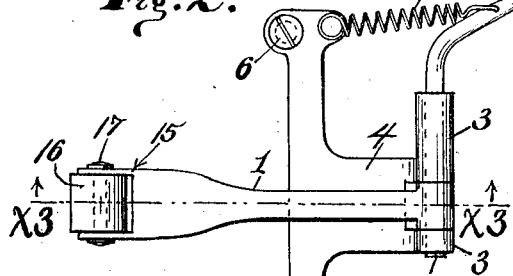
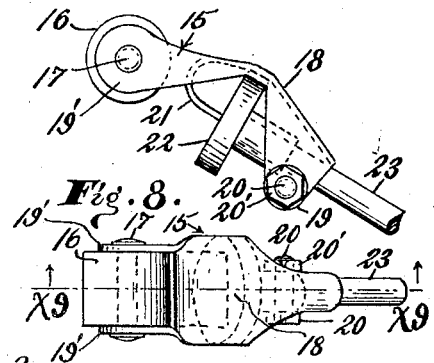
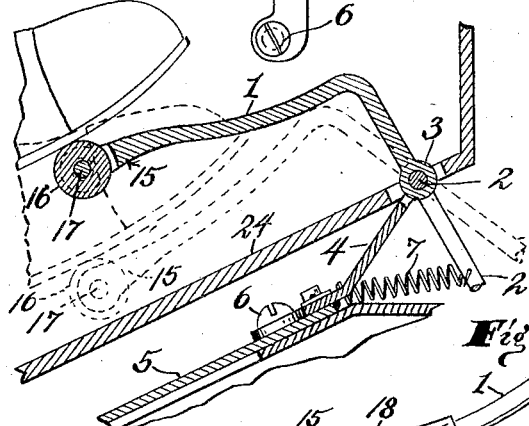
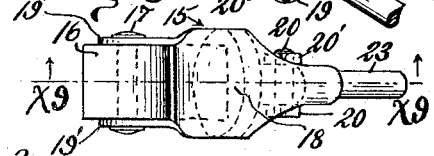
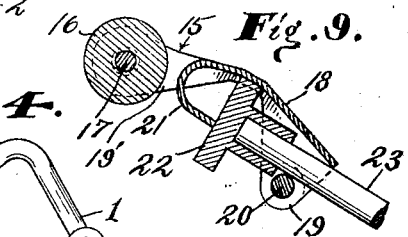
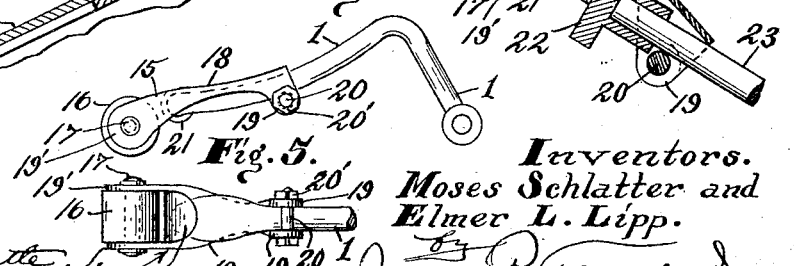
Witness:
W. M. Gentle.
Inventors.
Moses Schlatter and
Elmer L. Lipp.
by James R. Townsend
their atty Patented Nov. 23, 1926.

1,607,694

UNITED STATES PATENT OFFICE.

MOSES SCHLATTER AND ELMER L. LIPP, OF LOS ANGELES, CALIFORNIA, ASSIGNORS TO AMERICAN MECHANICAL WORKS, OF LOS ANGELES, CALIFORNIA, A CORPORATION OF CALIFORNIA.

AUTOMOBILE ACCELERATOR PEDAL.

Application filed March 5, 1924. Serial No. 696,957.

This invention relates to pedals for opening and closing the throttle valve of an internal combustion engine and is more particularly intended for use with automobile engine throttles with which there is such constant use under ordinary circumstances as to tire the foot of the driver of the car.

An object of the invention is to avoid tiring the operator's foot.

An object is to provide a pedal adapted to compensate for changes of position relative to the foot and the pedal.

Heretofore it has been customary in the operation of an automobile accelerator, for the operator to move his foot forward or backward to compensate for changes of position on the pedal so as to avoid a pressure therefrom that would in a short time become very tiring.

This invention is broadly new, basic and pioneer, in that the pedal arm has a compensating roller on the free end thereof so as to enable the heel of the pedal operating foot to be held stationary on a suitable support, as on the floor of the automobile while the operator's toe rocks to actuate the pedal.

An object of the invention is to provide a pedal that is smooth in operation; and constructed and arranged to avoid severe strains on an operator's foot.

An object of the invention is to provide a roller tip appliance that can be easily and quickly attached to accelerator pedals now in use.

An object is to so construct and combine the parts of the appliance as an attachment, that, when the same is installed, it will be stable, and the parts will be certain to maintain their operative position on the pedal.

Other objects are cheapness, durability, and effective operation.

A further object is to secure smoother operation of the car by avoiding the heretofore common friction between the foot of the operator and the pedal of the accelerator.

Other objects, advantages and features of invention may appear from the accompanying drawing, the subjoined detailed description and the appended claims.

The accompanying drawing illustrates the invention,

Figure 1 is a side view of a roller tip pedal constructed in accordance with this invention; as in use on an engine accelerator of the Ford type.

Fig. 2 is an enlarged detached plan view of the pedal shown in Fig. 1.

Fig. 3 is a fragmental section on line $x^3$, Fig. 2 showing in solid lines portions of an automobile floor and engine, and in solid and dotted lines the pedal and an operator's foot in different positions.

Fig. 4 is a side view showing on a pedal arm, a roller pedal tip attachment for bell crank pedals now in use.

Fig. 5 is a fragmental view of a portion of Fig. 4 as viewed from the under side.

Fig. 6 is a side view of a roller tip pedal attachment constructed and arranged for thrust pedals now in common use; an operator's foot is shown in position to actuate the pedal.

Fig. 7 is an enlarged detached fragmental side view of the pedal shown in Fig. 6.

Fig. 8 is a fragmental plan view of the pedal shown in Fig. 7.

Fig. 9 is a fragmental section on line $x^9$, Fig. 8.

In Figs. 1, 2, 3, of the drawing I have shown a bell crank pedal having an arm or lever 1 that is similar in construction, arrangement, and operation to the arm of a pedal shown in my application for United States patent filed June 25, 1923, Serial No. 647,550, for an accelerator for internal combustion engines.

In said figures the pedal 1 is fixed to a rock shaft 2 that is journaled in bearings 3 of a bracket 4 that is fixed to the transmission casing 5 by screws 6; a spring 7 extending from the bracket 4 to the shaft 2 normally holds the pedal arm 1 in position at which the throttle valve of the carburetor $a$ is closed.

The shaft 2 is connected to the throttle valve lever $b$, by rod 13, rock bar 10 and associated parts that are described in detail in said application.

The pedal arm or lever 1 is provided with a forked free bearing end generally indicated at 15 in which an anti-friction tread piece in the form of a roller 16, is mounted. Preferably the roller is rotatably supported by a pin 17 and is arranged to extend slightly above and beyond the pedal 1 so that the operator's foot can act upon the roller without touching the pedal arm.

In Figs. 4 to 9 inclusive, the roller 16 is mounted in the forked end 15 of a sheet metal body 18 to form an attachment that can be applied to pedals now in common use. In said attachment the body is formed in a metal stamping comprising a central web and downwardly extending lateral lugs 19, and a forked end forming terminal prongs 19', and a tongue 21 extending downwardly between the roots of the two prongs 19'. The lugs 19 are adapted to extend downward on opposite sides of the pedal arm 1 against which they abut to receive a bolt 20 and nut 20' by which the lugs are clamped onto the pedal arm; and the prongs 19' of the forked end 15 support the bolt 17 of the roller 16, and the central portion of the web of the body is bent downward and forms a strut 21 that extends over, around and against the free end of the pedal arm 1 and down and back to hook under or abut against or to rest on or engage the arm; and said strut serves to support and secure the projecting end of the attachment, when said bolt 18 is in place on and attached to the arm of a type of pedal now in use, so as to provide the same with a tread roller.

The stamping having the body 18 thus constitutes a forked end for the pedal arm 1 and provides such arm with the roller end or tip 16 that is adapted to be attached to a form of thrust pedal now in common use. In this construction shown in Figs. 7, 8 and 9, the strut 21 abuts the face of the button 22 on the thrust pedal 23; and the bolt 20 is in advance of the button to clamp the lugs 19 securely to the pedal 23.

In use the operator's heel can rest easily on the floor 24 and the toe or ball of the foot may lightly rest on the roller 16, and the pedal responds freely to operation of the toe or ball of the foot against the roller.

We claim:
1. The attachment for accelerator levers set forth, comprising a sheet metal body forked at one end; a tread roller mounted between the prongs of the fork; a strut adjacent said roller; lugs at the other end of said body; and means for securing said lugs to a pedal so that said strut will engage the end of the pedal.

2. Attachment for accelerators set forth comprising a sheet metal stamping forming a body having a forked end; a tread roller secured in the forked end; a hook integral with said body that is arranged adjacent said roller; a pedal arm; lugs integral with said body and arranged to straddle said pedal arm; and a bolt for clamping said lugs to said pedal arm so as to secure said body to said pedal arm in position for said hook to engage the free end of said pedal arm.

3. The attachment for accelerator levers comprising a sheet metal body forked at one end; a tread roller mounted between the prongs of the fork; lugs at the other end of said body; and a bolt extending through said lugs.

4. An attachment for automobile accelerator levers comprising a body forked at one end; a roller journalled between the prongs of the fork; means adapted to secure said body to an accelerator lever; and a strut adapted to engage the free end of said lever when said body is secured thereto.

5. The attachment for accelerator levers comprising a body adapted to project beyond the end of said lever; a roller journalled on the free end of said body; means securing said body to the lever; and a strut adapted to support the projecting end of said body.

In testimony whereof, we have hereunto set our hands at Los Angeles, California, this 25th day of February, 1924.

MOSES SCHLATTER.
ELMER L. LIPP.